Figure 1:
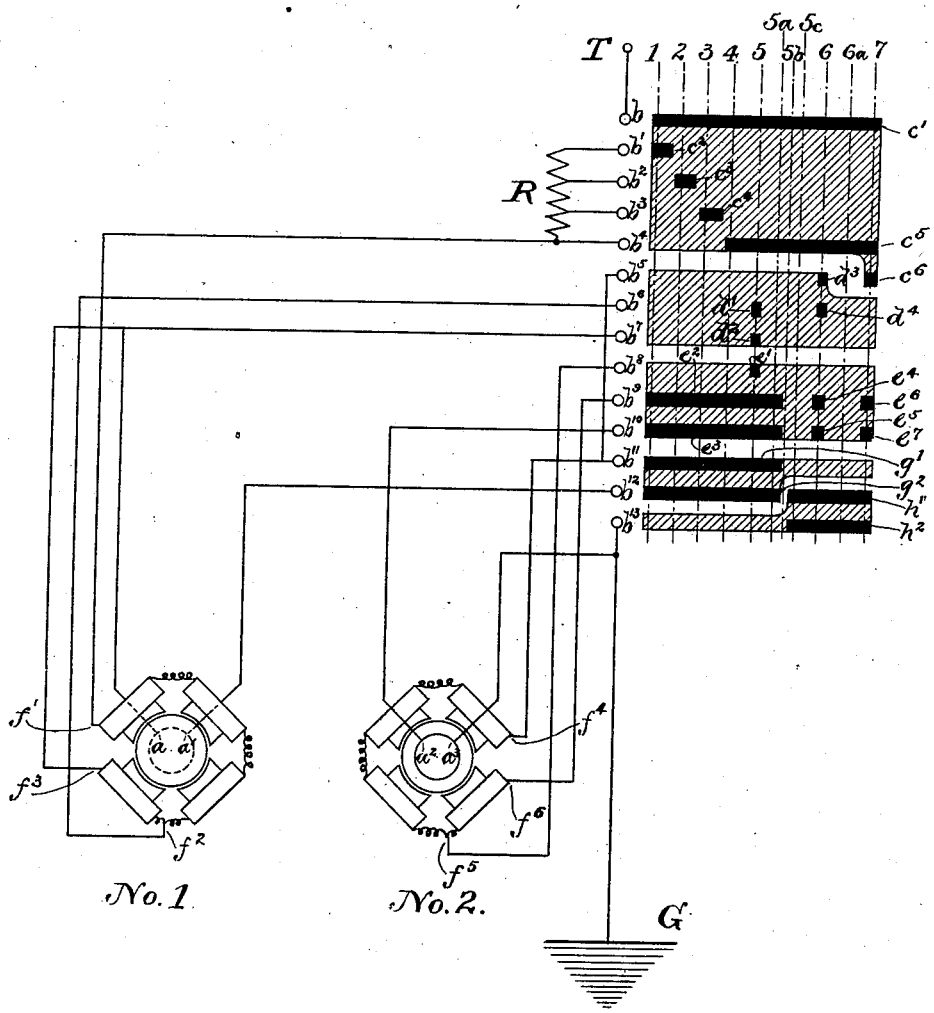

No. 722,527. PATENTED MAR. 10, 1903.
F. A. MERRICK.
ELECTRIC CONTROLLER.
APPLICATION FILED OCT. 14, 1902.
NO MODEL. 2 SHEETS—SHEET 2.

UNITED STATES PATENT OFFICE.

FRANK A. MERRICK, OF JOHNSTOWN, PENNSYLVANIA, ASSIGNOR TO WESTINGHOUSE ELECTRIC & MANUFACTURING COMPANY, A CORPORATION OF PENNSYLVANIA.

ELECTRIC CONTROLLER.

SPECIFICATION forming part of Letters Patent No. 722,527, dated March 10, 1903.

Application filed October 14, 1902. Serial No. 127,215. (No model.)

*To all whom it may concern:*

Be it known that I, FRANK A. MERRICK, a citizen of the United States, residing at Johnstown, county of Cambria, and State of Pennsylvania, have invented a new and useful Improvement in Electric Controllers, of which the following is a full, clear, and exact description, reference being had to the accompanying drawings, which form a part of this specification.

My invention relates to the control of series-wound electric motors; and its object is to provide a controller therefor that will accelerate the motors and regulate their speed in a simple and efficient manner.

The controller that I have provided is one of the general class known as "series-parallel controllers," which are more usually used to control electric-railway motors.

My improvement consists in the construction and arrangement I employ, by which certain novel steps or series of steps are provided to accelerate or regulate the motors at speeds higher than that obtained by placing the two motors, as units, electrically in series with each other. More particularly, these novel steps or series of steps constitute an advantageous way of changing two such motors from series to multiple in such a way that even though no external resistance be used the motors are not subject to abnormal rushes of current or dangerous inductive effects. Moreover, I am enabled to make this change without disrupting the main circuit and subjecting the controller to heavy sparking. In addition, in changing from series to parallel the intermediate speeds provided are such as to accelerate gradually and also to allow of positions at which the controller may rest for a considerable time to give a desired speed without injury to the motors. To these ends I connect to the controller a point on each field-winding intermediate to its terminals and arrange the contacts on the controller, as hereinafter set out, in such a way that at appropriate positions I can effect a short circuit around a part of each field-winding to provide safe positions in which the speed is increased by the weakening of the field-magnet thus caused. I also so arrange the controller-contacts and the connections therefrom to the motors whereby I may place one motor in parallel with the armature and a portion of the field-winding of the other motor, the remaining portions of such field-winding being in series with the two branch circuits, and therefore receiving the current of the whole circuit. This novel step I have found to be an extremely advantageous one, the motors dividing the work well without taking an unsafe current. The two steps here suggested are advantageously used together, for they can be made to give a nicely-graded acceleration from a position in which the two motors, as units, are in series with each other to a position in which the two motors, as units, are in parallel with each other.

My invention also relates to certain other combinations of contacts and connections which enable me to efficiently change the connections from one step to another.

In the more specific application of my invention the part of the field-winding shunted by the controller at certain steps represents the entire winding of one or more of the field-magnet poles. Thus in a four-pole motor I have shunted the winding of one pole. This pole therefore becomes a consequent pole during such time as its winding is short-circuited, and I have found that this arrangement is attended with excellent results. An additional advantage of my invention is that I am enabled to provide a very simple arrangement of controller-contacts and one that may be cheaply constructed.

Figure 2:
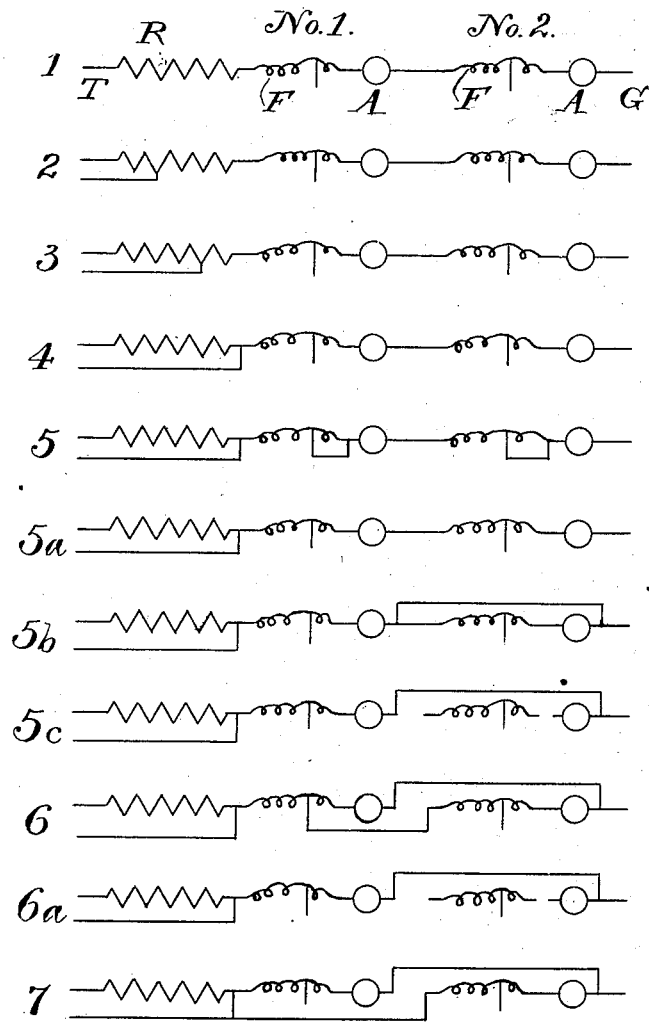

Referring to the drawings accompanying this specification, Figure 1 is a diagram of a controller, motors, and connections embodying my invention. Fig. 2 is a diagram of the various combinations effected by the controller at its various positions.

In Fig. 1 I have shown a diagram of a cylindrical controller, the cylinder-contacts being developed in a plane, and two four-pole motors. It is to be understood that this particular form of switch and this precise number and type of motors are only shown as illustrative, my invention being applicable to other forms of switches, to a greater number of motors, and to motors having a different number of poles. It is also to be understood that while for purposes of simplicity I have not shown reversing-switches, cut-out switches, &c., these would ordinarily be added to the circuit shown in the ordinary manner well known to electricians.

In Fig. 1, $c'$ to $c^6$, $d'$ to $d^4$, $e'$ to $e^7$, $g'$ and $g^2$, and $h'$ and $h^2$ are the contacts of the cylinder. These contacts are in five groups, as the reference-letters indicate, and the contacts of each group are insulated from the contacts of every other group; but all the contacts comprising any group are in permanent electrical connection with each other. By the movement of these combinations of contacts into engagement with the fourteen fixed contact-fingers $b$ to $b^{13}$, eleven combinations (indicated by lines marked 1, 2, 3, 4, 5, $5^a$, $5^b$, $5^c$, 6, $6^a$, and 7) are made as the cylinder is moved progressively in one direction, the resultant effects upon the circuit being shown in the similarly-marked positions in Fig. 2.

The two motors are indicated as motor No. 1 and motor No. 2.

$a$ and $a'$ are the terminals of the armature of motor No. 1 and $a^2$ and $a^3$ of motor No. 2.

$f'$ and $f^3$ are the terminals of the field-windings of motor No. 1, while $f^2$ represents an intermediate connection to the field-winding, the coils of one of the four poles being between this connection and the terminal connection $f^3$.

$f^4$ and $f^6$ are the terminals of the field-windings of motor No. 2, while $f^5$ is the intermediate connection similar to $f^3$.

T represents one side of the main circuit, and G the other side thereof.

The contact-fingers are connected as follows: $b$ to one side of the circuit T; $b'$, $b^2$, and $b^3$ to sections of an artificial resistance R, $b^4$ to the terminal of the resistance R and to field-terminal $f'$; $b^5$ to $b^{11}$ and field-terminal $f^4$; $b^6$ to intermediate field connection $f^2$; $b^7$ to field-terminal $f^3$ and also to armature-terminal $a$, (thus $f^3$ and $a$ are connected together regardless of the position of the controller;) $b^8$ to intermediate field connection $f^5$; $b^9$ to field-terminal $f^6$; $b^{10}$ to armature connection $a^2$; $b^{11}$ to $b^5$ and to field-terminal $f^4$; $b^{12}$ to armature-terminal $a'$; $b^{13}$ to armature-terminal $a^3$ and to the opposite side of the circuit G.

Assume the controller with dotted line 1 in contact with the fingers $b$ to $b^{13}$. The current from T passes by way of $b$ $c'$ $c^2$ and $b'$ through resistance R, thence directly to $f'$ through all the field-coils of No. 1 motor to $f^3$, thence to armature-terminal $a$ through the armature of the same motor to terminal $a'$, thence to $b^{12}$, $g'$, $g^2$, and $b^{11}$ to field-terminal $f^4$, through all field-coils of motor No. 2 to terminal $f^6$, thence by way of $b^9$, $e^2$, $e^3$, and $b^{10}$ to armature-terminal $a^2$, through the second armature to terminal $a^3$ to the other side G of the circuit. This is shown in position 1 of Fig. 2, where the field and armature of each motor are designated F and A, respectively. This is an ordinary series position of the two motors with artificial resistance used in the ordinary manner. The intermediate field connections $f^2$ and $f^5$ are inactive at this position, since the fingers $b^6$ and $b^8$, to which they are connected, engage none of the cylinder-contacts. Positions 2, 3, and 4 effect no change in the circuit except that the successive engagement of contacts $c^3$, $c^4$, and $c^5$ with fingers $b^2$, $b^3$, and $b^4$ and successive disengagement of contacts $c^2$, $c^3$, and $c^4$ with fingers $b'$, $b^2$, and $b^3$ short-circuits and then cuts out the sections of resistance R, leaving at position 4 the motors in plain series with each other without any artificial resistance. The change that occurs at position 5 is that caused by the presence of contacts $d'$, $d^2$, and $e'$, which at this position engage fingers $b^6$, $b^7$, and $b^8$, respectively. This forms a short circuit around the field-winding of one of the poles of motor No. 1, because the current after passing from field-terminal $f'$ to connection $f^2$ has a direct path to terminal $f^3$ via $b^6$, $d'$, $d^2$, and $b^7$. A similar short circuit about the windings of one of the poles of motor No. 2 is established by the path from $f^5$ to $b^8$ to $e'$ to $e^2$ to $b^9$ to $f^6$. In this position, therefore, the motors remain in series, as before; but the short circuit about one of the coils of each motor increases the rate of speed, because the field strength, and therefore the counter electromotive force, of the motors, is decreased, and also because the resistance of the circuit is somewhat diminished. Thus one of the poles of each motor is without an energizing-coil, and this temporarily turns this motor into one having one consequent pole. An advantage I have found to result from weakening the field by short-circuiting the field-windings of one or more of the poles is that the speed of the motor is changed substantially in inverse proportion to the change in the number of normally excited field-windings in circuit. Hitherto it has been necessary to decrease the field excitation considerably more than this, proportionately to the increase of speed desired. Position $5^a$ reëstablishes the same condition as was present at position 4. This position is only a transitory position and not, like position 5, one that the motorman is expected to use as a speed-step. The short circuits are removed at position $5^a$ in order to increase the counter electromotive force and reduce the current preliminarily to a breaking of connections. Position $5^b$ is another transitory position in the change of connections from position 5 to position 6. At position $5^b$ finger $b^{12}$ engages both contacts $g^2$ and $h'$ and finger $b^{13}$ engages contact $h^2$. The result of this is that though the motors are connected in series, as before, there is a short circuit established about motor No. 2, since armature-terminal $a'$ of motor No. 1 is connected to G by $b^{12}$, $h'$, $h^2$, and $b^{13}$. This robs motor No. 2 of current in order that its circuit may be readily broken at $5^c$ preparatory to making the connections of position 6. At position $5^c$ fingers $b^9$, $b^{10}$, $b^{11}$, and $b^{12}$ have broken engagement with contacts $e^2$, $e^3$, $g'$, and $g^2$, thus opening the circuit between the two motors and incidentally between the field and armature of motor No. 2. At position 6, which is another accelerating position or one that the operator is expected to rest upon, the current may be traced as follows: from T to $b$, to $c^5$, to $b^4$, to terminal $f'$, to intermediate field connection $f^2$, thus passing through three of the four coils of the field-winding of motor No. 1. From $f^2$ the current divides, one path passing through the remaining field-coil to terminal $f^3$, to armature-terminal $a$, through armature of motor No. 1 to terminal $a'$, to $b^{12}$, $h'$, $h^2$, $b^{13}$ to G, while the other path passes from $f^2$ to $b^6$, $d^4$, $d^3$, $b^5$, terminal $f^4$, field of motor No. 2, terminal $f^6$, $b^9$, $e^4$, $e^5$, $b^{10}$, terminal $a^2$, armature of No. 2 motor, terminal $a^3$, G, thus placing the bulk of the field of motor No. 1 in series with parallel paths, in one of which is the remaining portion of said field in series with its armature and in the other of which is the whole of the other motor. This position can give an excellently-graded intermediate speed to that of positions 5 and 7, and the motors are well protected and divide the load well. The resistance of one of the parallel paths (that containing motor No. 2) is greater, while to counterbalance this the counter electromotive force of the armature of motor No. 1 is the greater. When the load is greatest, the effect of this is to make the motors divide the work very equally, and this is, of course, very advantageous. Moreover, the portion of the field-winding in the branch circuit with the armature of No. 1 motor is decidedly advantageous in protecting such armature from flashing due to a local current otherwise produced when the motors are occasionally acting as generators, since such local current will pass through this portion of the field-winding and sufficiently excite the field to obviate the flashing by preventing the accumulation of any considerable quantity of local current. In position $6^a$ fingers $b^5$, $b^6$, $b^9$, and $b^{10}$ are no longer in engagement with contacts $d^3$, $d^4$, $e^4$, and $e^5$, so that the breaks are made in the circuit as indicated in Fig. 2. This is a transitory position preparatory to connecting up in the ordinary multiple relation of position 7. Position 7 is the maximum-speed position in which the motors as units are placed in parallel with each other. The current passes from T to $b$ to $c'$ to $c^5$ and $c^6$. From $c^5$ one path comprises $b^4$ $f'$, field-motor No. 1, $f^3$, $a$, armature-motor No. 1, $a'$, $b^{12}$, $h'$, $h^2$, $b^{13}$, and G, while the other path comprises $c^6$, $b^5$, $f^4$, field-motor No. 2, $f^6$, $b^9$, $e^6$, $e^7$, $b^{10}$, $a^2$, armature-motor No. 2, $a^3$, and G.

I have illustrated my invention by a specific embodiment thereof which advantageously employs the various features of my invention; but my invention as set out in the claims is much broader than said specific embodiment, and I do not, therefore, desire to limit myself to the particular arrangement and combinations described nor to the employment of all the various features of my invention together. I might add also that while the motors I have shown are ordinary series motors having no shunt field-winding, the applicability of my invention to many compound-wound motors is obvious, since such motors have a field-winding in series with the armature. Therefore, while I refer to the motors as "series electric motors," I mean this term to apply to any motor having a field-winding in series with its armature to which my invention may be applied.

Having now fully described my invention, what I claim, and desire to protect by Letters Patent, is—

1. An electric controller for motors having contacts and connections so arranged relatively to one another as to place two motors in series with each other, then shunt a portion of each field-winding, then place one motor in parallel with a part only of the other motor, the remaining part of said last-mentioned motor being in series with the parallel circuits, and then place the two motors in parallel.

2. An electric controller for motors having contacts and connections so arranged relatively to one another as to place two motors in series with each other, then shunt a portion of each field-winding, then place one motor in parallel with the armature and a part of the field-winding of the other motor, the balance of said field-winding being in series with the parallel circuits, and then place the motors in parallel.

3. In an electric-motor controller, contacts and connections arranged to place a motor in parallel with the armature and a part of the field-winding of another motor, the balance of said field-winding being in series with the parallel circuits.

4. The combination with an electric motor having an energizing-coil for each of its field-magnet poles, of a circuit from one terminal of the energizing-coils of one of said poles to the other terminal thereof, and a controlling-switch in such circuit adapted to open or close the same.

5. The combination with an electric controller and motors controlled thereby, each having an energizing-coil for each of its field-magnet poles, of a circuit from the terminals of the energizing-coil of one of the poles of one motor, a similar circuit from the other motor, and contacts in each of said circuits for opening and closing the same, said contacts being carried by the said controller.

6. A series-parallel controller for series electric motors having contacts and connections arranged to accelerate the motors between their series relation and their multiple relation by intermediate positions, the first of which weakens the field-magnet strength of the motors without disturbing their connection to each other, and the second of which places one motor in parallel with the armature and a part of the field-winding of the other motor, the remaining portion of said field-winding being in series with the parallel circuits.

7. A series-parallel controller for series electric motors having contacts and connections arranged to accelerate the motors between their series relation and their multiple relation by intermediate positions, the first of which short-circuits a portion of the field-winding of each motor without disturbing the connection of the motors to each other, and the second of which places one motor in parallel with the armature and a part of the field-winding of the other motor, the remaining portion of said field-winding being in series with the parallel circuits.

8. A series-parallel controller for series electric motors having contacts and connections arranged to short-circuit the field-windings of one of the poles of each motor at a position of the controller intermediate to the ordinary series and parallel positions thereof.

9. An electric controller for series electric motors having contacts and connections arranged to place the two motors in series with each other, then to weaken the fields of said motors to increase their speed, then to strengthen the fields again to reduce the current for changing connections, then to short-circuit and disconnect one motor, then to connect said motor in parallel with the armature and a portion of the field-winding of the other motor to further increase the speed of the motors, then to disconnect one motor, and finally place the motors in parallel with each other to further increase the speed of the motors.

10. An electric controller for series electric motors having contacts and connections arranged to place the two motors in series with each other, then to short-circuit a portion of the field-windings of each motor to increase their speed, then to remove said short circuits to reduce the current for changing connections, then to short-circuit and disconnect one motor, then to connect said motor in parallel with the armature and a portion of the field-winding of the other motor to further increase the speed of the motors, then to disconnect one motor, and finally place the motors in parallel with each other to further increase the speed of the motors.

11. An electric controller for series electric motors having contacts and connections arranged to place the two motors in series with each other, then to short-circuit the field-winding of one of the poles of each motor, then to remove said short circuit, then to short-circuit and disconnect one motor, then to connect said motor in parallel with the armature and a portion of the field-winding of the other motor to further increase the speed of the motors, then to disconnect one motor, and finally place the motors in parallel with each other to further increase the speed of the motors.

12. An electric controller for series electric motors having contacts and connections arranged to place the two motors in series with each other, then to short-circuit the field-winding of one of the poles of each motor, then to remove said short circuit, then to short-circuit and disconnect one motor, then to connect said motor in parallel with the armature and the field-winding of one of the poles of the other motor to further increase the speed of the motors, then to disconnect one motor, and finally place the motors in parallel with each other to further increase the speed of the motors.

13. The combination of a four-pole motor, a field-coil for each pole thereof, said field-coils being in series with each other, a controlling-switch having contacts and connections for connecting said field-coils into the circuit, and having contacts $d'$ and $d^2$ in electric connection with each other and adapted to be brought into or out of engagement with stationary contacts $b^6$ and $b^7$, connected to the opposite terminals of one of said field-coils.

14. The combination of a pair of four-pole motors having field-coils for each pole, the four field-coils being in series with each other, a controlling-switch having contacts and connections for bringing said field-coils into the circuit, contacts $d'$ and $d^2$ in electric connection with each other, stationary contacts $b^6$ and $b^7$ connected to the opposite terminals of one of the four field-coils of one of the motors, contacts $e'$ and $e^2$ in electric connection with each other, stationary contacts $b^8$ and $b^9$ connected to the opposite terminals of one of the four field-coils of the other of the motors, and means for substantially simultaneously making or breaking contact between said contacts $d'$, $d^2$, $e'$ and $e^2$, and the stationary contacts $b^6$, $b^7$, $b^8$ and $b^9$ respectively.

15. In an electric controller for two series-wound electric motors, stationary contact $b^6$ connected to an intermediate point in the field-winding of one of the motors, contacts $d'$ and $d^4$ adapted at different positions of the controller to engage stationary contact $b^6$, stationary contacts $b^7$ and $b^5$, connected respectively to a terminal of said field-winding and to the other of the motors, contacts $d^2$ and $d^3$ in electric connection with contacts $d'$ and $d^4$ respectively, contact $d^2$ being placed at the same position of the controller as contact $d'$ and contact $d^3$ being placed at the same position of the controller as contact $d^4$.

16. An electric controller for series electric motors having contacts and connections arranged to place the two motors in series with each other, then to short-circuit a portion of the field-windings of each motor to increase their speed, then to remove said short circuit to reduce the current for changing connections, and then to change connections and connect the motors to give a higher speed.

17. An electric controller for series electric motors having contacts and connections arranged to place the two motors in series with each other, then to short-circuit the field-winding of one of the poles of each motor to increase the speed of the motors, then to remove said short circuits to reduce the current for changing connections, then to change connections and connect the motors to give a higher speed.

In testimony of which invention I have hereunto set my hand, at Johnstown, Pennsylvania, on this 26th day of September, 1902.

FRANK A. MERRICK.

Witnesses:
D. H. DAVIES,
H. W. SMITH.